United States Patent [19]

Knebel

[11] Patent Number: 4,700,885
[45] Date of Patent: Oct. 20, 1987

[54] MIXING VALVE FOR PLUMBING

[75] Inventor: Peter Knebel, Iserlohn, Fed. Rep. of Germany

[73] Assignee: Knebel & Rottger GmbH & Co., Fed. Rep. of Germany

[21] Appl. No.: 870,804

[22] Filed: Jun. 5, 1986

[30] Foreign Application Priority Data

Aug. 31, 1985 [DE] Fed. Rep. of Germany ....... 3531194

[51] Int. Cl.$^4$ ...................... G05D 23/13; F16K 11/24
[52] U.S. Cl. .............................. 236/12.16; 236/12.13; 236/12.1; 137/552; 137/637; 137/625.41; 251/129.11
[58] Field of Search ........... 137/551, 552, 637, 625.41; 251/129.11; 236/12.1, 12.13, 12.16

[56] References Cited

U.S. PATENT DOCUMENTS

| 2,984,388 | 5/1961 | Scarr et al. | 137/625.41 X |
| 3,001,717 | 9/1961 | Rimsha et al. | 236/12.13 |
| 3,721,386 | 3/1973 | Brick et al. | 137/625.41 X |
| 4,339,737 | 7/1982 | Meyers et al. | 251/129.11 X |
| 4,407,444 | 10/1983 | Knebel et al. | 236/12.1 |
| 4,509,550 | 4/1985 | Monk | 137/551 |
| 4,611,757 | 9/1986 | Saether | 137/625.41 X |

FOREIGN PATENT DOCUMENTS

| 2410316 | 9/1975 | Fed. Rep. of Germany ... 236/12.16 |
| 2403502 | 5/1979 | France .................................. 137/637 |

Primary Examiner—Alan Cohan
Assistant Examiner—John A. Rivell
Attorney, Agent, or Firm—Jacobs & Jacobs

[57] ABSTRACT

The improvement of a mixing valve for plumbing in which three ceramic valve discs with appropriate control ducts are positioned parallel to one another in reciprocally watertight manner, in a housing with one hot water and one cold water inlet and one outlet, the disc on the inlet side being a stationary bearing disc, while the second disc rests against this first disc and can be turned from outside in order to control the quantity of flow, and the third disc can be slid linearly against the second disc for temperature adjustment by means of a manually adjustable thermostat that operates laterally to the disc axis, said improvement to be achieved in such manner that flow regulation can be simplified, a motor regulator capable of rotating engages with the second disc, the shaft of which said regulator fits into the stationary disc in a rotating manner and is immovably connected with the second disc, and the regulator can be adjusted by means of an electronic and individually adjustable flow regulator.

11 Claims, 4 Drawing Figures

MIXING VALVE FOR PLUMBING

The invention concerns a mixing valve for plumbing of the three ceramic valve disc type described and generally known from German Patent Specification No. 30 41 979 in which provision is made for a crankshaft-type, cranked-lever rod, for the purpose of regulating flow in the valve housing, one end of said lever rod being oriented outward and having a manually operated turning handle, while the other end freely passes through the third disc and engages with the second disc.

The object of the present invention is therefore to improve on a mixing valve for plumbing, of the type above described, in such manner that considerable simplification of flow control can be achieved without loss of the advantages already achieved in the art and ensuring high reliability and security of operation as well.

The achievement of this objective is characterized by the provision of a rotatable motor regulator which engages the second disc, the shaft of which rotatable motor regulator passes through the stationary disc in a rotating manner and is connected immovably to the second disc, whereby the regulator can be controlled by means of an electronically and individually adjustable flow control.

Due to these features, not only is the operation of the mixing valve simplified, but a free and unimpeded supply of water is achieved. In addition, the valve can be constructed even more easily and compactly than before. Also, remote control is made possible.

It is advantageous to house the shaft in the first disc in such manner that it can rotate.

An advantageous further development that increases the structural freedom of the valve, among other advantages, is characterized in that the regulator is installed outside the valve housing and its shaft passes through the valve housing in a rotatable watertight manner.

Another advantage of the valve described consists in limiting the electronic flow control regulator to an on/off function and in making the flow adjustable by means of a time-dependent key control.

In order to decrease inaccuracies in measuring the temperature of the mixing water as the result of any inadequate blending, a mixing chamber is installed in the direction of flow behind the third disc and is directly connected to said disc, into which said mixing chamber the control ducts of the third disc discharge, and the mixing chamber has a water outlet channel that is aligned with a thermostat extension component installed outside the mixing chamber.

In addition, an embodiment particularly favorable to manufacturing is characterized in that downstream from the third disc there is a cap that together with the third disc forms the mixing chamber, that the outlet channel for the medium is positioned in the cap, and that the thermostat regulator engages the cap.

The electronically adjustable regulator can be built with electro-mechanical, electro-magnetic, or hydraulic drive.

It is a further advantage that the electronically adjustable regulator opens the hot and cold water passage and an energy storage unit is provided for the regulator, which said energy storage unit shuts off the flow of hot and cold water through the second disc when the regulator is not operating.

This ensures that in the event of a defect in the regulator the valve will be shut off independently, that is, by the energy storage unit, so that an undesired passage of water will be prevented, among other effects.

One embodiment preferred under certain circumstances is also characterized by the fact that the electronically adjustable regulator opens and closes the cold and hot water passage by means of the second disc, and that only if the regulator fails does the energy storage unit automatically cause the cold and hot water passage to close, specifically, in the event that the return behavior of the energy storage unit should have an unfavorable regulatory effect. Embodiments of the energy storage unit are hereinafter described.

It is also advantageous to provide for a bypass that can be blocked and which leads directly from the cold water inlet to the outlet for the medium.

The advantage of this is that in the event the regulator breaks down, water can nevertheless be drawn through the bypass.

One embodiment of the mixing valve hereinabove described that further improves ease of use is characterized by the provision on the valve housing of a temperature indicator which is influenced by a temperature sensor installed in the valve housing, particularly in such manner that the temperature indicator is installed in the inlet opening of the housing, and that a cover that closes the inlet opening is installed below the temperature indicator to which said cover the temperature sensor is clamped.

One example of an embodiment of the invention is shown in the accompanying drawings in which.

Figure 1:
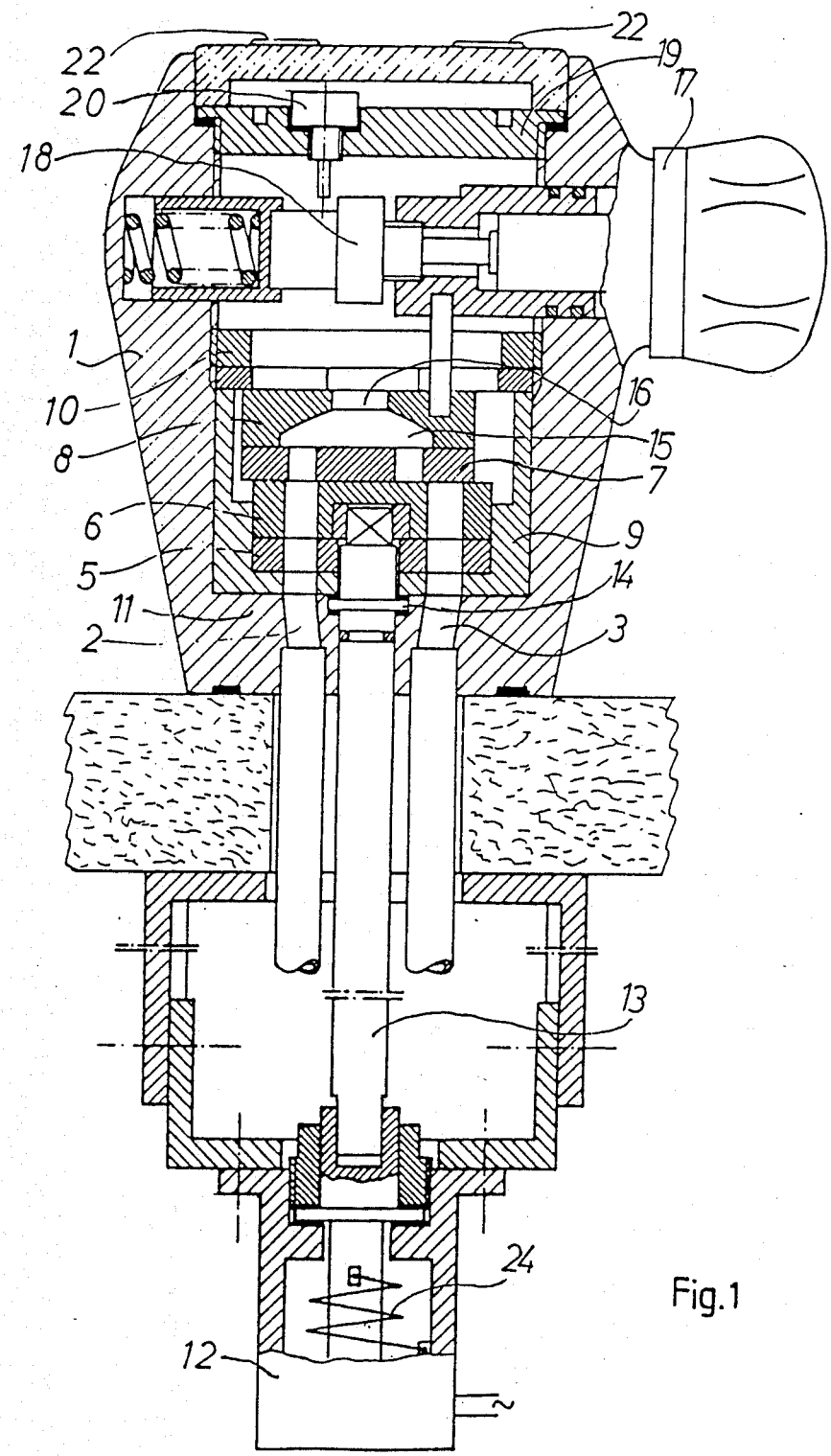
FIG. 1 shows in longitudinal cross-section a mixing valve for plumbing according to this invention.

The mixing valve comprises a housing 1 having a hot water inlet 2, a cold water inlet 3 and a laterally extending outlet 4.

The water inlets are installed on the base of the housing at right angles thereto and parallel to one another. Three ceramic valve discs 5, 6 and 7 are inserted in housing 1, which said valve discs rest on top of one another and are reciprocally watertight, and each of which said valve discs has two control ducts.

The three discs 5, 6 and 7 and a cap 8 installed downstream of the third disc 7 are inserted in a cup-shaped component 9, which by means of a slider 10 is mounted on housing floor 11 in watertight manner.

The first disc 5 is immovably installed in component 9, which has ducts positioned concentrically to the control ducts of disc 5, in such manner that the control ducts in the first disc 5 face the cold and hot water inlet concentrically.

For the purpose of regulating water flow, the second disc 6 can turn on disc 5, and when disc 6 is turned, the control ducts positioned diametrically opposite and on the same pitch circle open or close both the cold and the hot water inlet.

The open position is illustrated in FIG. 1.

For the purpose of turning disc 6, a regulator 12 that can be motor and electronically controlled is provided outside the valve housing 1 and under its base, the shaft 13 of which said regulator 12 passes through the housing floor 11, the insert floor, and the first disc 5 in such manner that it can rotate and fits immovably into a hole in disc 6.

In addition, shaft 13 is housed in housing floor 11 in such manner that it can rotate and remain watertight. To fix shaft 13 in axial direction, said shaft 13 is equipped with a collar 14, the faces of which are supported on housing floor 11 or on the floor of insert 9 so that they can rotate.

For purposes of temperature regulation, the third disc 7 can be adjusted in rectilinear manner against disc 6. Cap 8 is connected with third disc 7 so as to form a mixing chamber 15. The control duct of third disc 7 discharges into mixing chamber 15.

In addition, cap 8 has a centrally positioned mixing chamber 15 that narrows toward channel 16. Above the channel, a manually adjustable thermostat 17 that acts on third disc 7 is inserted into housing 1, the channel 16 being oriented toward extension element 18 of said thermostat 17. Above the thermostat there is a cover 19 that closes the mounting opening of housing 1 in watertight fashion. A temperature sensor 20 extends to the passage channel of the valve and is clamped to cover 19, which said temperature sensor 20 controls a temperature indicator 21 inserted above cover 19 into the mounting opening and adjustable electronically. In addition to the temperature indicator, two keys 22 are provided which are used for manual control of the electronic flow regulator.

The regulator 12 is removably attached to the base of housing 1 by two screws. 23. In addition, regulator 12 is designed merely for sliding the second disc 6 into the open position of the valve, while the mixing valve is closed by an energy storage component allocated to regulator 12.

The energy storage component 24 is an extensibly installed torsion bar, which is further extended by regulator 12 when the mixing valve is opened.

Figure 2:
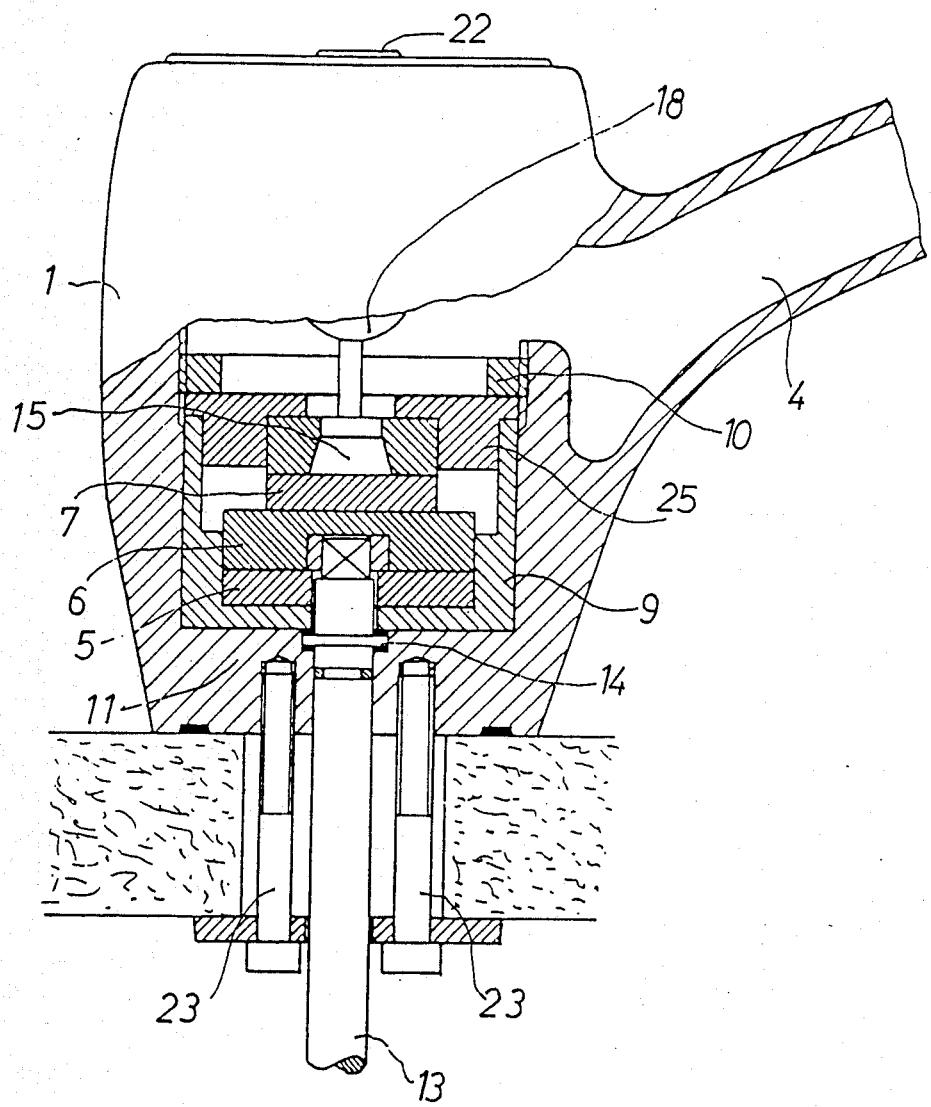
FIG. 2 shows a side view of FIG. 1, partially opened up.
Figure 3:
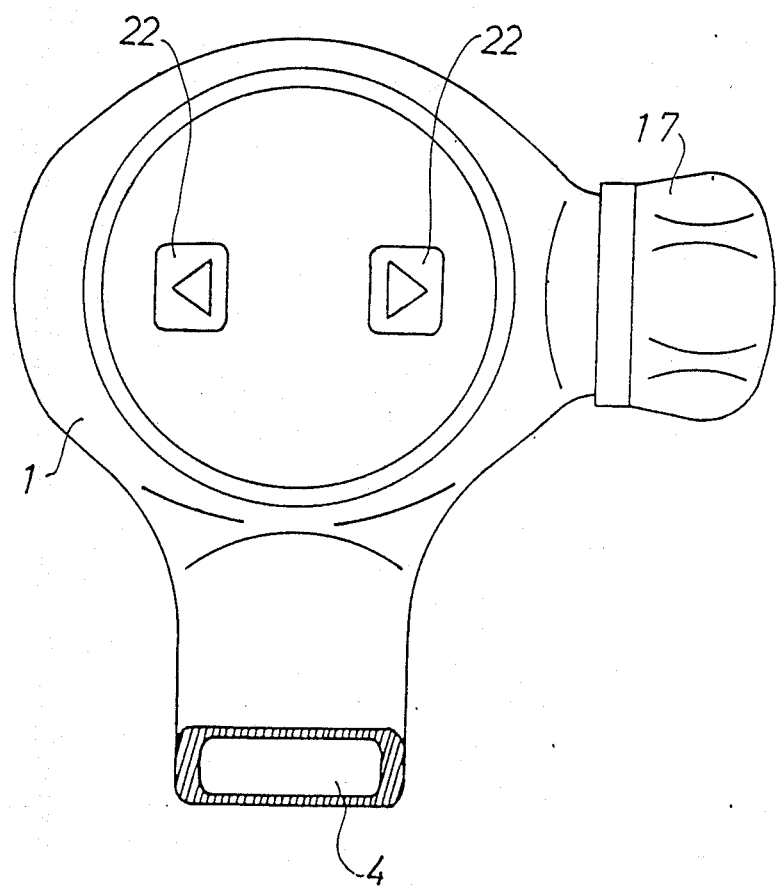
FIG. 3 shows the mixing valve of FIG. 1 seen from above.
Figure 4:
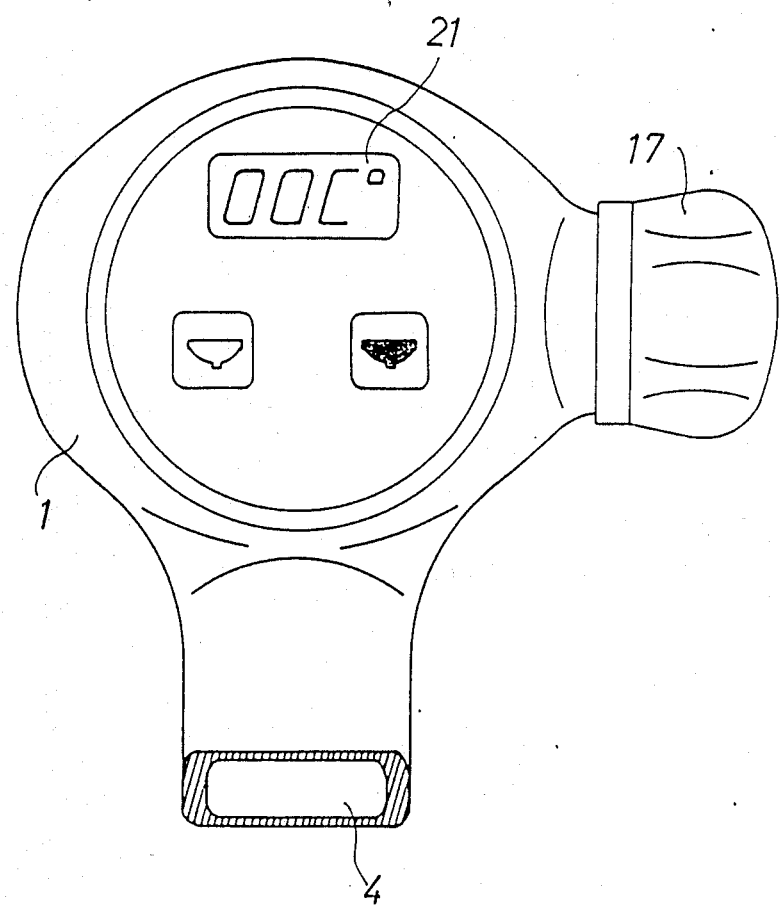
FIG. 4 is similar to FIG. 3 but showing a modification.

As can be seen in FIG. 2, third disc 7 is adjustably guided in a straight line in a channel of a disc 25 clamped between slider 10 and insert 9.

The mixing valve is at the same time maintained in stationary position by screws 23.

All new individual and combination characteristics in the description and/or drawing are deemed a part of the invention.

What is claimed is:

1. Mixing valve for plumbing comprising three ceramic valve discs with appropriate control ducts positioned parallel to one another in reciprocally watertight manner disposed in a housing having one hot water inlet and one cold water inlet and one outlet, the ceramic disc on the inlet side being a stationary bearing disc against which the second disc rests and can be rotated from outside the housing to control the amount of flow, the third disc being slidable linearly against the second disc for temperature adjustment by means of a manually adjustable thermostat operating laterally with respect to the disc axis, a rotatable motor regulator engaging the second disc and having a shaft fitting into the stationary disc in rotatable manner and connected to the second disc and the regulator being controlled by an associated electronic flow regulator.

2. Mixing valve according to claim 1, wherein the motor regulator is mounted outside the valve housing with its shaft passing through the valve housing in a rotating and watertight manner.

3. Mixing valve according to claim 1, wherein the electronic flow regulator control is limited to an on/off function so that the flow can be adjusted by means of a timing control.

4. Mixing valve according to claim 1, wherein in the direction of flow and behind the third ceramic disc a mixing chamber is provided which is directly connected to said third disc and into which mixing chamber the control ducts of the third disc discharge, the mixing chamber having an outlet channel aligned with an extension of a thermostat installed outside the mixing chamber.

5. Mixing valve according to claim 4, wherein downstream from the third disc there is a cap which together with the third disc forms the mixing chamber, the outlet channel for the medium being mounted on the cap and with which the thermostat engages.

6. Mixing valve according to claim 5, wherein the motor regulator opens the cold and hot water passages and an energy storage unit is provided for the regulator which closes the cold and hot water inlets by means of the second ceramic disc when the motor regulator is not in operation.

7. Mixing valve according to claim 1, wherein the electronic flow regulator opens and closes the cold and hot water passage by means of the second ceramic disc, and only upon the failure of which regulator an energy storage unit automatically closes the cold and hot water passage.

8. Mixing valve according to claim 6, wherein there is provided spring means such as a torsion bar which can be extended from the motor regulator to provide an energy storage unit.

9. Mixing valve according to claim 1, wherein the discs and a mixing chamber are disposed in a cup-shaped component and combined into an assembly unit with an outlet opening oriented toward an extension element of a thermostat inserted into the valve housing having at its top end an openably closed inlet opening, a floor of the cup-shaped component having appropriate ducts positioned concentrically and facing the hot and cold water inlets and the control ducts of said stationary disc, the shaft of motor regulator passing through the floor of the component in a rotatable manner.

10. Mixing valve according to claim 9, wherein the shaft of the motor regulator is fixed in an axial direction by means of a collor installed between the valve housing and the floor of the component.

11. Mixing valve according to claim 1, wherein provision is made on the valve housing for a temperature indicator influenced by a temperature sensor installed in the valve housing in such manner that the temperature indicator is positioned in the valve housing and extends into a chamber above a mixing chamber.

* * * * *